(12) United States Patent
Loudon et al.

(10) Patent No.: US 6,891,971 B2
(45) Date of Patent: May 10, 2005

(54) RECOGNITION PROCESS

(75) Inventors: Gareth Hugh Loudon, Singapore (SG); Tai Hou Tng, Singapore (SG); Hong Chen, Fremont, CA (US)

(73) Assignees: Apple Computer, Inc., Cupertino, CA (US); Laboratories for Information Technology, Singapore (SG)

( * ) Notice: Subject to any disclaimer, the term of this patent is extended or adjusted under 35 U.S.C. 154(b) by 0 days.

(21) Appl. No.: 09/719,090

(22) PCT Filed: Dec. 8, 2000

(86) PCT No.: PCT/SG98/00042

§ 371 (c)(1),
(2), (4) Date: Apr. 10, 2001

(87) PCT Pub. No.: WO99/64982

PCT Pub. Date: Dec. 16, 1999

(65) Prior Publication Data

US 2003/0086611 A1 May 8, 2003

(51) Int. Cl.[7] .................................................. G06K 9/18
(52) U.S. Cl. ........................ 382/186; 382/187; 382/202
(58) Field of Search ................................ 382/176–178, 382/181, 185–188, 202, 284, 288

(56) References Cited

U.S. PATENT DOCUMENTS

| 4,462,703 | A | * | 7/1984 | Lee .............................. 400/110 |
| 5,454,046 | A | * | 9/1995 | Carman, II ................. 382/186 |
| 5,724,445 | A | | 3/1998 | Niki ............................ 382/187 |
| 5,796,867 | A | * | 8/1998 | Chen et al. ................. 382/187 |
| 6,275,611 | B1 | * | 8/2001 | Parthasarathy .............. 382/187 |

FOREIGN PATENT DOCUMENTS

| EP | 0 371 596 A2 | 6/1990 |
| EP | 0 686 931 A2 | 12/1992 |
| EP | 0 645 730 A1 | 3/1995 |
| WO | WO 86/00444 | 1/1986 |
| WO | WO 95/15535 | 6/1995 |

* cited by examiner

Primary Examiner—Daniel Miriam
(74) Attorney, Agent, or Firm—Blakely, Sokoloff, Taylor & Zafman; Stephen M. De Klerk (57) ABSTRACT

A recognition process for handwritten characters, including generating sub-segments representing at least one character stroke, the sub-segments each having a boundary enclosing the at least one stroke of the sub-segment, merging the sub-segments when the distance between centroids of the sub-segments are less than a predetermined threshold, and generating segments representing possible characters from the sub-segments.

36 Claims, 6 Drawing Sheets

RECOGNITION PROCESS

The present invention relates to a recognition process, and in particular to a process for the recognition of handwritten ideographic scripts, such as Chinese and Japanese, by computer processing equipment.

In addition to the large number of characters for ideographic languages, there are a number of difficulties inherent in the segmentation and recognition of ideographic scripts, such as Chinese and Japanese. For instance, in Chinese handwriting most of the ideographic characters consist of more than two radicals, where the radicals are sub-components of a character. Any of the radicals can also be individual characters by themselves. This makes segmentation difficult because the individual character recognition result is valid even if a character is inadvertently segmented into several radicals. Accordingly, linguistic knowledge is normally required to distinguish or determine correct segmentation of handwritten strokes, in the same manner as a person would group radicals into a character by the meaning and context.

Furthermore, in free handwriting, the space between characters and the space between radicals vary considerably. Although it is common for a writer to leave a larger gap between characters and between radicals, this spatial Information is not normally reliable and in many cases there are no spaces at all between characters. Previous recognition processes and equipment have dealt with this problem by requiring the writer to enter characters in a restricted space or in a defined manner. This may involve entering characters in boxes on a display screen, or the writer having to follow guides on a screen which force the writer to write characters with a clear separation and definition. Alternatively, a writer needs to predefine the space placed between characters to avoid incorrect segmentation of character strokes. Processing of the written characters for character recognition is then not normally performed until a complete sentence is written.

An additional difficulty is that Chinese characters are written either horizontally or vertically.

Accordingly, it is desired to provide a recognition process which allows a person to write naturally in a continuous manner, without restrictions imposed by the process, and which performs segmentation of characters during the writing process, or at least provides a useful alternative.

In accordance with the present invention there is provided a recognition process for handwritten characters, including:
  generating sub-segments representing at least one character stroke, said sub-segments each having a boundary enclosing the at least one stroke of the sub-segment;
  merging said sub-segments when the distance between centroids of the sub-segments are less than a predetermined threshold; and
  generating segments representing possible characters from said sub-segments.

The present invention further provides a recognition apparatus having:
  means for inputting character strokes;
  means for generating sub-segments representing at least one character stroke, said sub-segments each having a boundary enclosing the at least one stroke of the sub-segment;
  means for merging said sub-segments when the distance between centroids of the sub-segments are less than a predetermined threshold; and
  means for generating segments representing possible characters from said sub-segments.

The present invention also provides a recognition module stored on a computer readable storage medium, having:
  means for generating sub-segments representing at least one character stroke, said sub-segments each having a boundary enclosing the at least one stroke of the sub-segment;
  means for merging said sub-segments when Fe distance between centroids of the sub-segments are less than a predetermined threshold; and
  means for generating segments representing possible characters from said sub-segments.

A preferred embodiment of the present invention is hereinafter described, by way of example only, with reference to the accompanying drawings, wherein.

Figure 1:
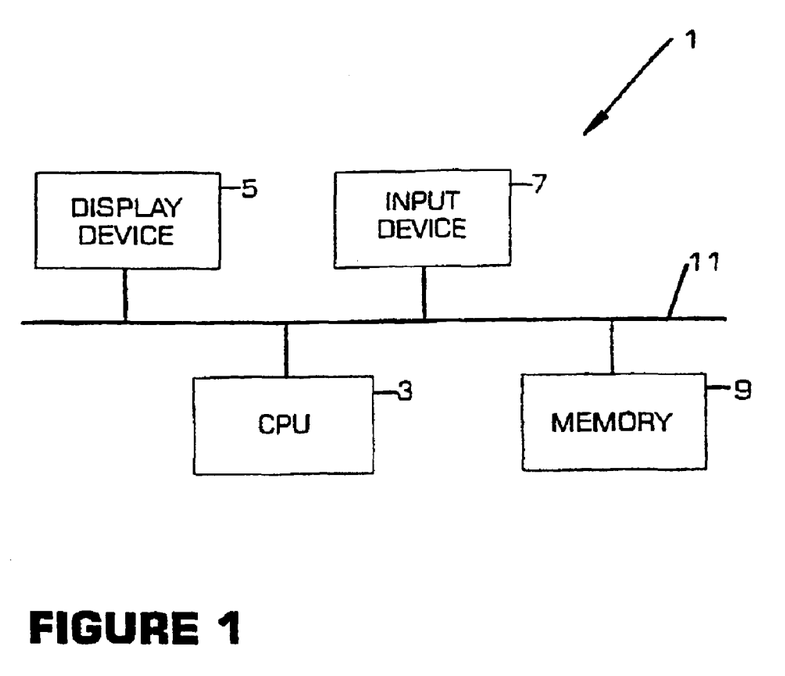
FIG. 1 is a block diagram of a preferred embodiment of a recognition apparatus.

A general purpose computer system 1, the components of which are shown in FIG. 1, can be used to form a recognition apparatus which implements or executes a recognition process 2 described below. The computer system 1 includes a central processing unit (CPU) 3, a display device 5, an input device 7 and a memory 9 interconnected via a bus 11. The display device 5, such as a CRT monitor, an LCD screen, plasma display or other display mechanism, provides a visual display of information that is processed within the computer system. The memory 9 generally includes a main memory which is typically implemented In the form of a random access memory, a static memory that can comprise a read only memory and a permanent storage device such as a magnetic or optical disk or other suitable computer-readable media. The input device 7 can be any Input device, such as a writing tablet, which allows the entry of handwritten character strokes. The computer system 1 is exemplary and it will be appreciated that other computer systems with other configurations can be used. Examples of computer systems which can be used include, but are not limited to, the Newton Message Pad by Apple Computer, Inc, the PalmPilot produced by 3 Com and a Power Mac 7500 with a WACOM tablet.

Figure 2:
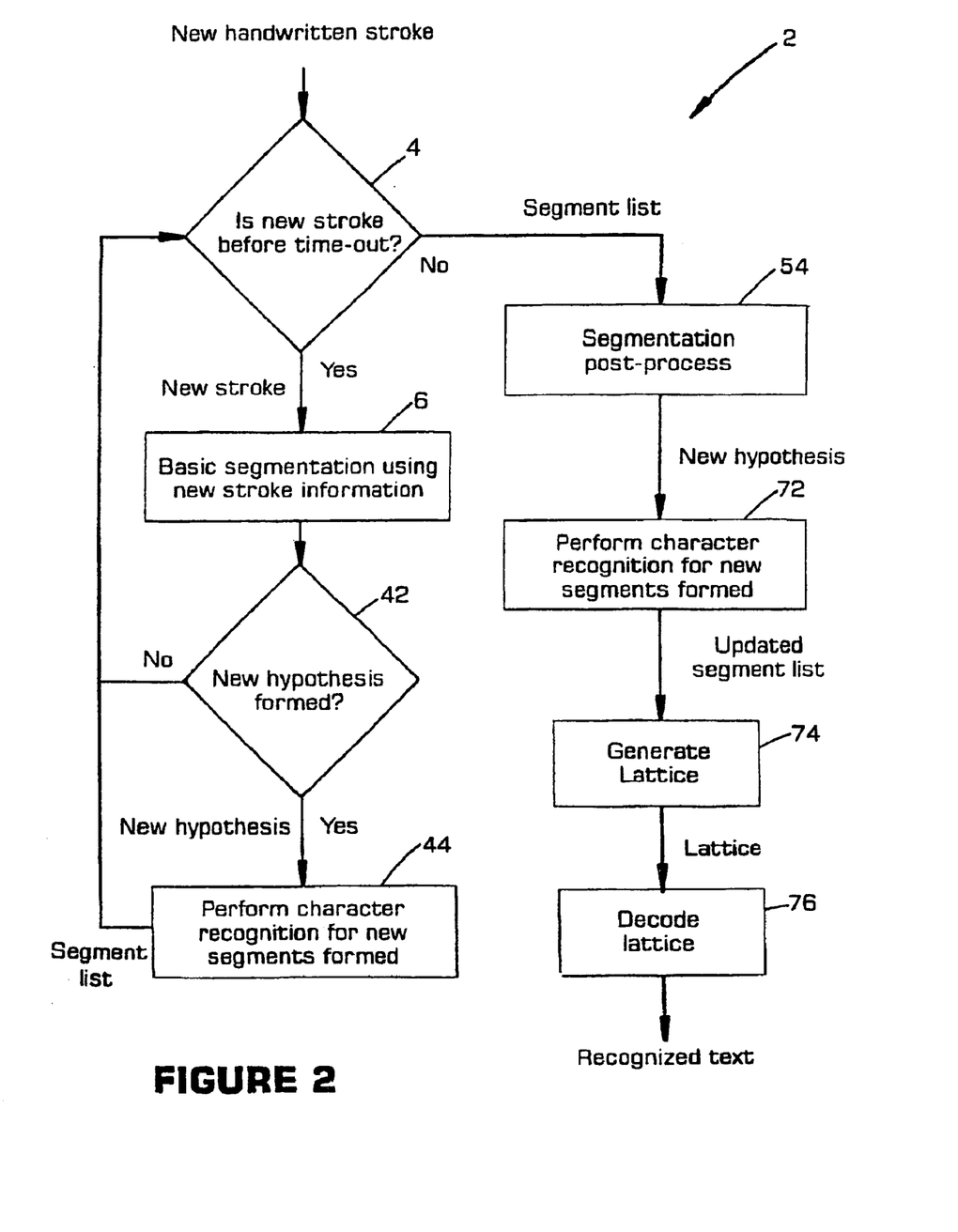
FIG. 2 is a flow diagram of a preferred embodiment of a recognition process.

A handwriting recognition process 2, as shown in FIG. 2, can be executed on the computer system 1 of FIG. 1. Typically, instructions for causing the CPU 3 to perform the steps of the process 2 are stored in memory 9, e.g. permanently stored on computer-readable media and loaded into random access memory for execution during the operation of the system 1.

The recognition process 2 begins execution at step 4 where it polls for entry of a new handwritten stroke by a user of the equipment. If a new stroke is detected at step 4, processing proceeds to a basic segmentation module at step 6.

Figure 3A:
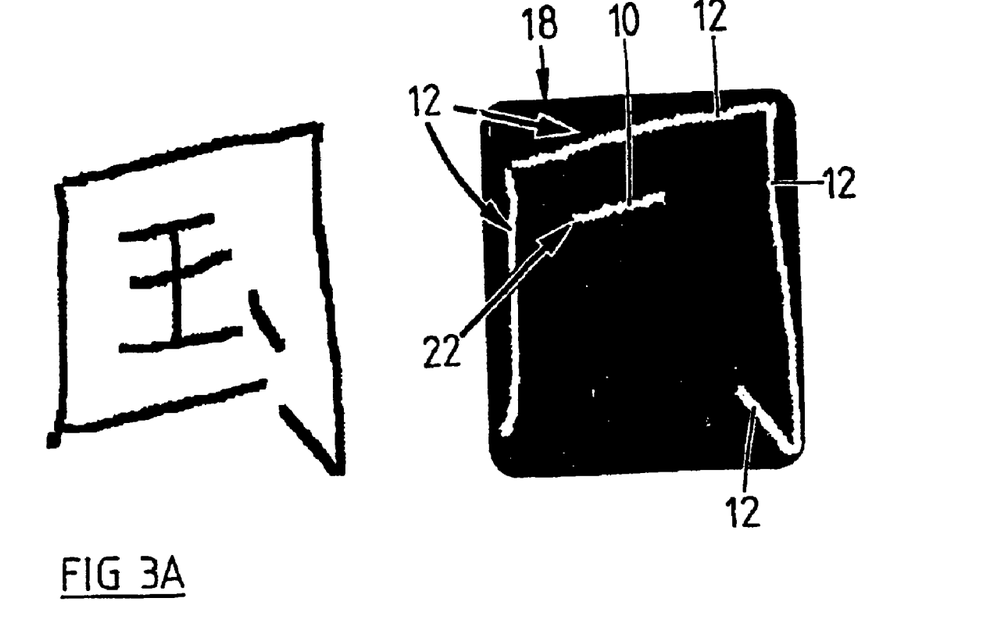
FIGS. 3a and 3b are diagrams of characters having strokes in sub-segments.
Figure 3B:
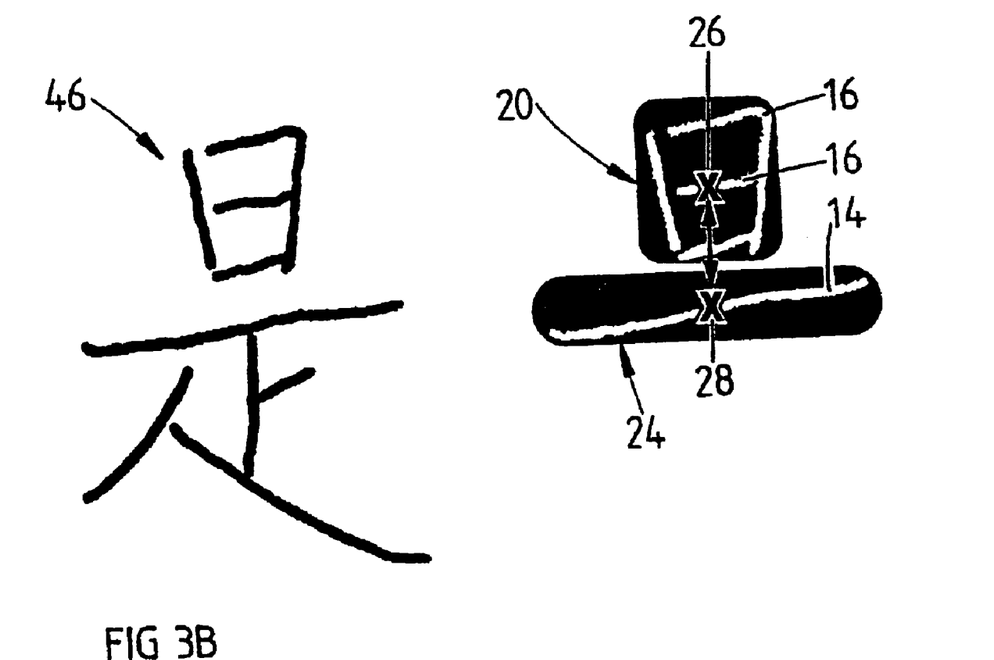

The basic segmentation module executes a number of processing steps to perform basic segmentation of handwritten strokes. For every newly written stroke, which is defined as the movement of a pen or stylus across the screen or tablet between touching the screen or tablet and leaving the screen or tablet, a check is made to see if the new stroke is surrounded by a previous group of strokes, which form a sub-segment. As shown in FIG. 3a, a new stroke 10 may be surrounded by a group of previous strokes 12, or as shown in FIG. 3b, a new stroke 14 may be sufficiently removed from a previous group of strokes 16. Bounding boxes 18 and 20 of the previous sub-segments, and bounding boxes 22 and 24 for the new strokes are determined and used to decide if the new stroke is surrounded by previous strokes. A new stroke 10 contained in the bounding box of a previous sub-segment 12, joins or is merged with that sub-segment 12. If the new stroke 14 is not surrounded by the previous strokes 16, a distance between the centroids 26 and 28 of the bounding boxes 20 and 24 is determined. If the distance is less than a predetermined threshold, then the new stroke 24 is added to the sub-segment 16, and the centroid 26 and bounding box 20 of the sub-segment are updated. If the distance is greater than the set threshold, a new sub-segment is created. Sub-segments are used to form segments representing a possible character, as described below.

Figures 6, 7:
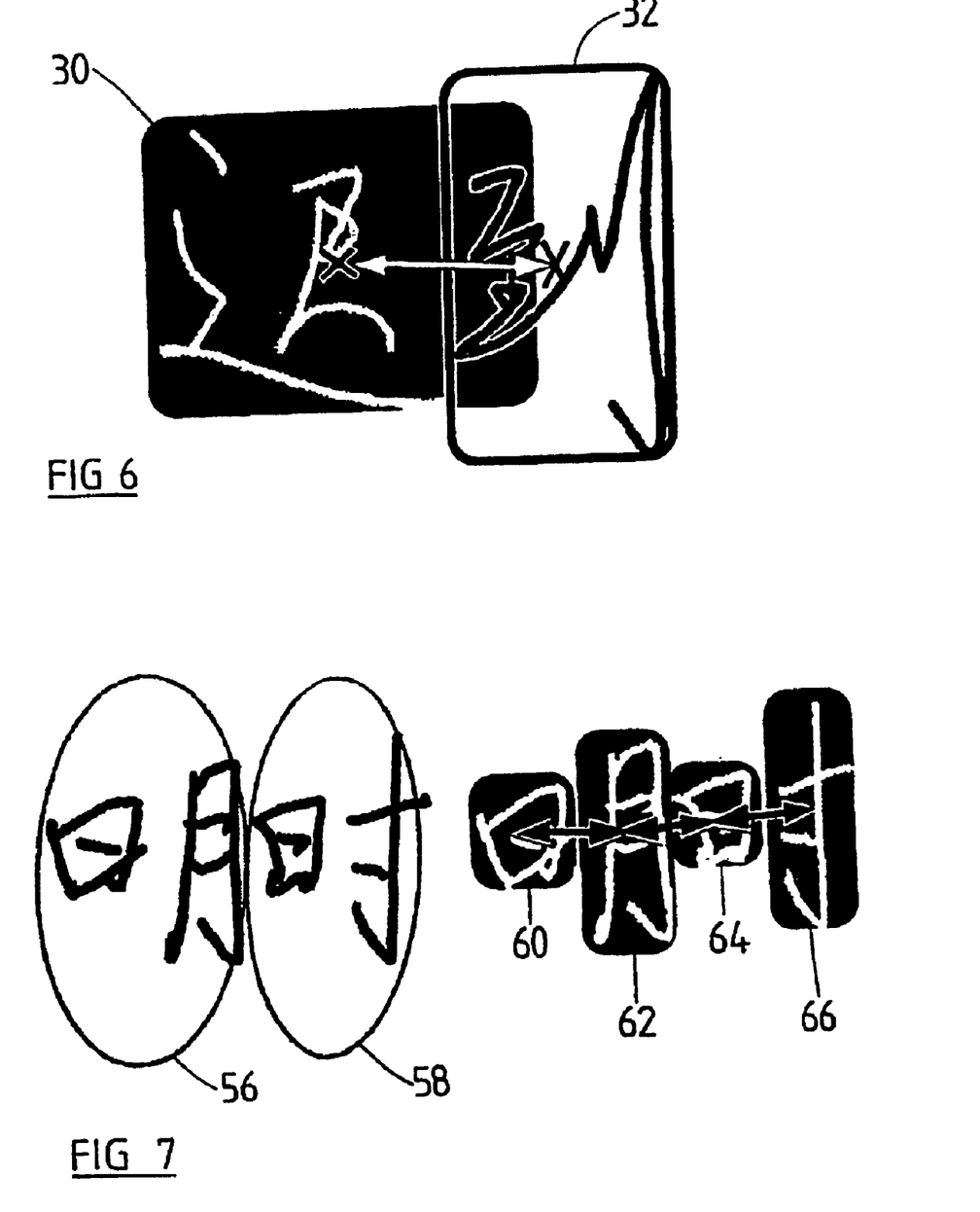
FIG. 6 is a diagram of segments generated for two overlapping characters.
FIG. 7 is a diagram of two adjacent characters having radicals spaced further apart than the characters.

Using the distance between centroids of a new stroke and a group of previous strokes, being the last sub-segment, as the criteria for grouping or segmenting strokes into possible character segments allows for the overlap of strokes from different characters. FIG. 6 shows an example where although two characters have overlapping strokes, and overlapping bounding boxes 30 and 32, the characters are segmented correctly and are not treated as one character because the distance between the centroids of the bounding boxes 30 and 32 exceeds the predetermined threshold. This allows users to write characters which overlap with each other and still achieve correct segmentation, thereby catering for the normal manner in which people handwrite sentences in Chinese or other ideographic scripts.

When a new sub-segment is created a check is made to determine how many sub-segments already exist If there are four sub-segments, the three previous sub-segments are processed to determine if any combination of them can be merged into one sub-segment or if any segment hypothesis can be formed. A merger of sub-segments is determined, as discussed above, by analysing the distance between the centroids of the sub-segments. A segment hypothesis represents a possible character, and if a hypothesis relating to a character can be determined from a sub-segment or group of sub-segments, then a segment or segment hypothesis, is created. Segments are created based on basic data concerning the characters, such as number of strokes and shape. The segment hypothesis, which includes data defining the segment, is ultimately passed to a character recognition module, as described below.

Figure 4:
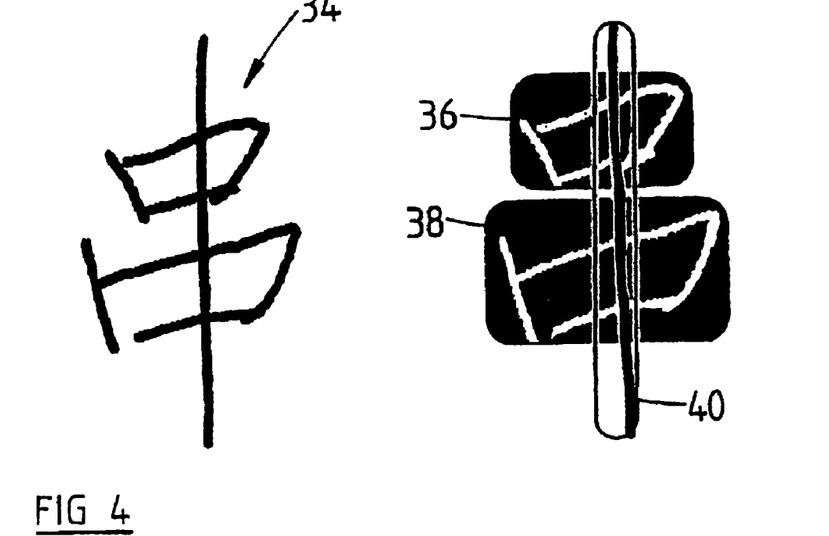
FIG. 4 is a diagram of a character having three sub-segments.

The use of a buffer of three sub-segments is important for the on-line segmentation recognition process 2, as it allows for the correct formation of segments. For instance, with reference to the character 34 shown in FIG. 4, the character has three sub-segments 36, 38 and 40. For a certain threshold, it is only when the last stroke of the sub-segment 40 is written that the distances between the centroids of the sub-segments 36 to 40 are small enough to result in the merger of the three sub-segments into one segment for the character. If a buffer for the two past sub-segments 36 and 38 had not been kept then these two sub-segments 36 and 38 will be split into separate segments. The basic segmentation module therefore allows correct segmentation to be executed in real-time, that is whilst the person is writing the characters in a sentence.

The basic segmentation module processes the stored sub-segments and each new stroke using at least eight different threshold levels for the centroid distances, ranging from small to large distances, for every new stroke. This allows the process to produce a number of segments from each character which each provide a segment hypothesis. At the end of step 6 for each new stroke, any new hypothesis formed by the basic segmentation module is determined at step 42, and any new hypothesis is passed to the character recognition module at step 44, The character recognition module, at step 44, executes character recognition for the segments it receives and produces a segment hypothesis list, each record in the list representing a unique segment, a possible character, and a character probability value. Processing then returns to step 4 to determine if a new stroke is received.

Figure 5:
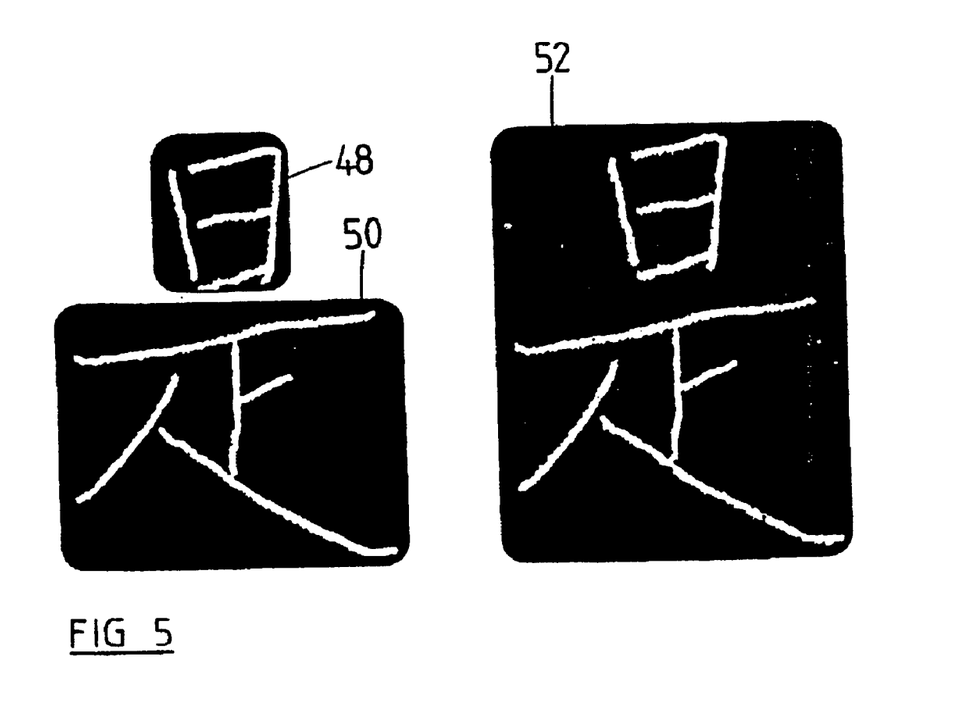
FIG. 5 is a diagram of three segments generated from a character.

The use of multiple thresholds and the creation of multiple hypotheses is particularly advantageous as character sizes can range from being very small, where a small threshold is required, to very large to where a large threshold is required, Also the distances between characters and strokes within a character can vary significantly. The use of the multiple thresholds enables the variations to be catered for, and the correct determination made from a number of possibly valid hypotheses. For instance, the character 46, as shown in FIG. 3b, can give rise to three possible segments 48, 50 and 52, as shown in FIG. 5.

When the recognition process 2 determines at step 4 that the writer has paused for a predetermined time, indicating all strokes of a sentence have been written, processing proceeds to a segmentation post-processing module at step 54. The segmentation post-processing module performs further processing on the segments in the segment hypothesis list produced by the basic segmentation module, in order to merge some of the adjacent segments. This is required to cater for the situation where the centroid distance between segments, which contain radicals of a character, is larger than the centroid distance between segments containing characters. When this occurs, a large threshold value used by the basic segmentation module groups together two characters, whereas a smaller threshold value splits the characters into radicals. This is illustrated in FIG. 7 for two characters 56 and 58 which are separated by a distance which is smaller than the distance between the radicals 60, 62, 64 and 66 of each character.

Figure 8:
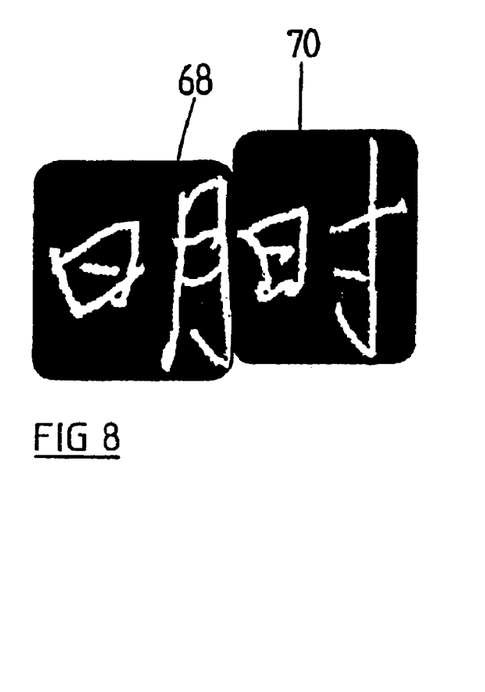
FIG. 8 is a diagram of segments generated for the characters of FIG. 6.
Figure 9:
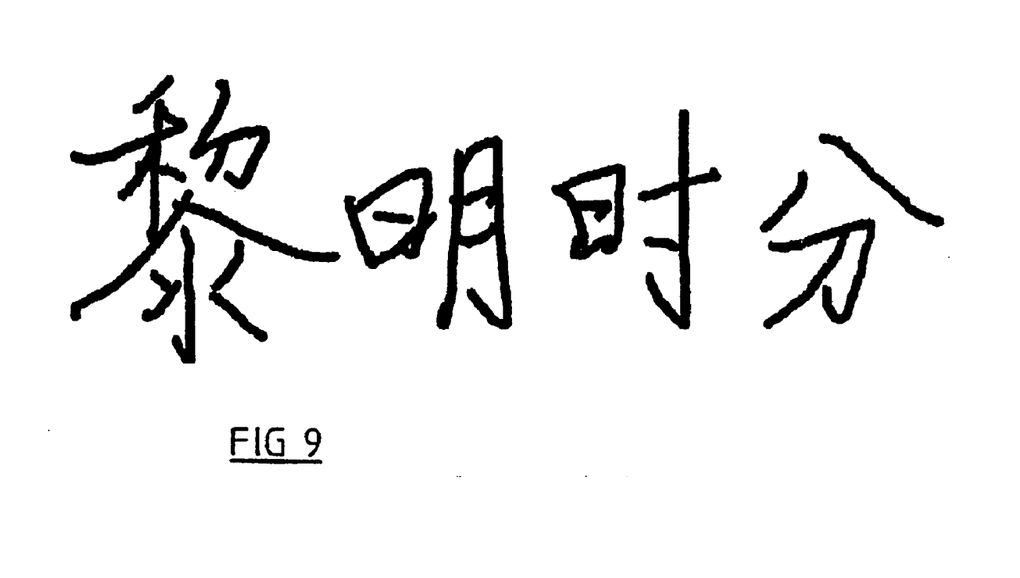
FIG. 9 is a diagram of a string of characters recognisable by the recognition process.

The segmentation post-processing module merges adjacent segments if the merged segment has a bounding box with a height to width ratio that is closer to the value of one. The basis for this rule is that ideographic characters are usually square in nature. Therefore if the result of merging two adjoining segments makes the merged segment more square in shape, then the post-processing module accepts this as a valid new segment. This is particularly advantageous for recognising characters which are written closer together. With reference to the characters 56 and 58 shown in FIG. 7, the post-processing module would produce two new segments 68 and 70 which have a height to width ratio closer to the value of one, as shown in FIG. 8. Character recognition is then performed on the new segments, using the character recognition module, at step 72, and the character recognition module updates the segment list accordingly. The character recognition module which the recognition process uses is a module which executes the recognition process described in U.S. patent application Ser. No. 08/652, 160, by G. H. Loudon, Y. M. Wu and J. A. Pittman, entitled "Methods and Apparatuses for Handwriting Recognition", herein incorporated by reference.

After the updated segment list has been formed with a character hypothesis for each segment, a lattice is generated at step 74 from the segment list based on the time sequence of the segments, in order to provide a lattice which can then be decoded at step 76 by a search process described in International Patent Application No. PCT/SG97/00061, by Y. L. Chow, entitled "A Method of Continuous Language Recognition", herein incorporated by reference. The decoding process of step 76 finds the most likely character sequence of the completed sentence by using the character hypotheses, which have respective probability values, in combination with a language model. The decoding process produces recognised text, which can be displayed by the processing equipment.

The recognition process 2 is a real-time process which provides an accuracy of about 90% for character recognition without requiring any rules to be imposed on the method and style of writing, particularly with regard to the spacing between characters.

Many modifications will be apparent to those skilled in the art without departing from the scope of the present invention as hereinbefore described with reference to the accompanying drawings.

What is claimed is:

1. A recognition process for handwritten characters, including:
    generating sub-segments representing at least one character stroke, said sub-segments each having a boundary enclosing the at least one stroke of the sub-segement;
    merging said sub-segments when the distance between centroids of the sub-segments are less than a predetermined threshold; and
    generating segments representing possible characters from said sub-segments.

2. A recognition process as claimed in claim 1, including processing a new character stroke by including said new stroke in one of said sub-segments when said stroke is within the boundary of said one of said sub-segments and generating a new sub-segment including said new stroke when said new stroke is outside of said boundary.

3. A recognition process as claimed in claim 1, wherein generating one of said segments includes processing at least three previously generated sub-segments.

4. A recognition process as claimed in claim 3, wherein said merging step includes merging said sub-segments using a plurality of predetermined thresholds for said distance.

5. A recognition process as claimed in claim 4, wherein said thresholds represent a range of distance values.

6. A recognition process as claimed in claim 1, including merging adjacent segments which produce a merged boundary having a height to width ratio closer to one than the separate boundaries of the adjacent segments.

7. A recognition process as claimed in claim 1, including performing character recognition on said segments to generate a segment list representing said segments and respective possible characters associated with said segments.

8. A recognition process as claimed in claim 7, including generating a time sequence representation of said possible characters from said segment list and processing said time sequence representation using a language model to generate text representing recognised characters.

9. A recognition process as claimed in claim 1, wherein said generating and merging steps are executed in the real-time as character strokes are written.

10. A recognition apparatus having:
    means for inputting character strokes;
    means for generating sub-segments representing at least one character stroke, said sub-segments each having a boundary enclosing the at least one stroke of the sub-segment;
    means for merging said sub-segments when the distance between centroids of the sub-segments are less than a predetermined threshold; and
    means for generating segments representing possible characters from said sub-segments.

11. A recognition apparatus as claimed in claim 10, including means for processing a new character stroke by including said new stroke in one of said sub-segments when said stroke is within the boundary of said one of said sub-segments and generating a new sub-segment including said new stroke when said new stroke is outside of said boundary.

12. A recognition apparatus as claimed in claim 11, having a segmentation unit which includes said sub-segment generating means, said merging means, said segment generating means and said new character stroke processing means, and which operates in real-time for each written character stroke.

13. A recognition apparatus as claimed in claim 10, wherein said merging means and said segment means process at least three previously generated sub-segments.

14. A recognition apparatus as claimed in claim 13, wherein said merging means merges said sub-segments using a plurality of predetermined thresholds for said distance.

15. A recognition apparatus as claimed in claim 14, wherein said thresholds represent a range of distance values.

16. A recognition apparatus as claimed in claim 10, including means for merging adjacent segments which produce a merged boundary having a height to width ratio closer to one than the separate boundaries of the adjacent segments.

17. A recognition apparatus as claimed in claim 10, including character recognition means for performing character recognition on said segments to generate a segment list representing said segments and respective possible characters associated with the segments.

18. A recognition apparatus as claimed in claim 17, including means for generating a time sequence representation of said possible characters from said segment list and for processing said time sequence representation using a language model to generate text representing recognised characters, and means for displaying said text.

19. A recognition module stored on a computer readable storage medium, having:
    means for generating sub-segments representing at least one character stroke, said sub-segments each having a boundary enclosing the at least one stroke of the sub-segment;
    means for merging said sub-segments when the distance between centroids of the sub-segments are less than a predetermined threshold; and
    means for generating segments representing possible characters from said sub-segments.

20. A recognition module as claimed in claim 19, including means for processing a new character stroke by including said new stroke in one of said sub-segments when said stroke is within the boundary of said one of said sub-segments and generating a new sub-segment including said new stroke when said new stroke is outside of said boundary.

21. A recognition module as claimed in claim 20, having a segmentation module which includes said sub-segment generating means, said merging means, said segment generating means and said new character stroke processing means, and which is executed in real-time for each written character stroke.

22. A recognition module as claimed in claim 19, wherein said merging means and said segment means process at least three previously generated sub-segments.

23. A recognition module as claimed in claim 22, wherein said merging means merges said sub-segments using a plurality of predetermined thresholds for said distance.

24. A recognition module as claimed in claim 23, wherein said thresholds represent a range of distance values.

25. A recognition module as claimed in claim 19, including means for merging adjacent segments which produce a merged boundary having a height to width ratio closer to one than the separate boundaries of the adjacent segments.

26. A recognition module as claimed in claim 19, including character recognition means for performing character recognition on said segments to generate a segment list representing said segments and respective possible characters associated with the segments.

27. A recognition module as claimed in claim 26, including means for generating a time sequence representation of said possible characters from said segment list and for processing said time sequence representation using a language model to generate text representing recognised characteristics.

28. A computer readable medium containing executable instructions for performing the steps of:
   generating sub-segments representing at least one character stroke, said sub-segments each having a boundary enclosing the at least one stroke of the sub-segment;
   merging said sub-segments when the distance between centroids of the sub-segments are less than a predetermined threshold; and
   generating segments representing possible characters from said sub-segments.

29. A computer readable medium as claimed in claim 28, further comprising the steps of processing a new character stroke by including said new stroke in one of said sub-segments when said stroke is within the boundary of said one of said sub-segments and generating a new sub-segment including said new stroke when said new stroke is outside of said boundary.

30. A computer readable medium as claimed in claim 28, wherein the step of generating one of said segments includes processing at least three previously generated sub-segments.

31. A computer readable medium as claimed in claim 30, wherein said merging step includes merging said sub-segments using plurality of predetermined thresholds for said distance.

32. A computer readable medium as claimed in claim 31, wherein said thresholds represent a range of distance values.

33. A computer readable medium as claimed in claim 28, including the step of merging adjacent segments with produce a merged boundary having a height to width ratio closer to one than the separate boundaries of the adjacent segments.

34. A computer readable medium as claimed in claim 28, including the step of performing character recognition on said segments to generate a segment list representing said segments and respective possible characters associated with said segments.

35. A computer readable medium as claimed in claim 34, including the step of generating a time sequence representation of said possible characters from said segment list and processing said time sequence representation using a language model to generate text representing recognised characters.

36. A computer readable medium as claimed in claim 28, wherein said generating and merging steps are executed in the real-time as character strokes are written.

\* \* \* \* \*